United States Patent
Dai et al.

(10) Patent No.: US 11,244,511 B2
(45) Date of Patent: Feb. 8, 2022

(54) AUGMENTED REALITY METHOD, SYSTEM AND TERMINAL DEVICE OF DISPLAYING AND CONTROLLING VIRTUAL CONTENT VIA INTERACTION DEVICE

(71) Applicant: GUANGDONG VIRTUAL REALITY TECHNOLOGY CO., LTD., Guangzhou (CN)

(72) Inventors: Jingwen Dai, Guangzhou (CN); Jie He, Guangzhou (CN)

(73) Assignee: GUANGDONG VIRTUAL REALITY TECHNOLOGY CO., LTD., Guangzhou (CN)

(*) Notice: Subject to any disclaimer, the term of this patent is extended or adjusted under 35 U.S.C. 154(b) by 0 days.

(21) Appl. No.: 16/731,055

(22) Filed: Dec. 31, 2019

(65) Prior Publication Data

US 2020/0143600 A1 May 7, 2020

Related U.S. Application Data

(63) Continuation of application No. PCT/CN2019/111790, filed on Oct. 18, 2019.

(30) Foreign Application Priority Data

Oct. 18, 2018 (CN) .......................... 201811217303.3
Oct. 18, 2018 (CN) .......................... 201811226280.2
Oct. 18, 2018 (CN) .......................... 201811226295.9

(51) Int. Cl.
*G06T 19/00* (2011.01)
*G06T 7/73* (2017.01)
*G06F 3/01* (2006.01)

(52) U.S. Cl.
CPC ............ *G06T 19/006* (2013.01); *G06F 3/011* (2013.01); *G06T 7/73* (2017.01); *G06T 2207/30204* (2013.01)

(58) Field of Classification Search
None
See application file for complete search history.

(56) References Cited

U.S. PATENT DOCUMENTS

2014/0347329 A1* 11/2014 Ware ................... G06F 3/0346
  345/179
2018/0095708 A1   4/2018 Black et al.
(Continued)

FOREIGN PATENT DOCUMENTS

| CN | 102722338 A | 10/2012 |
|---|---|---|
| CN | 108446011 A | 8/2018 |
| KR | 20100032267 A | 3/2010 |

OTHER PUBLICATIONS

International Search Report, International Application No. PCT/CN2019/111790, dated Jan. 19, 2020 (3 pages).

*Primary Examiner* — Saptarshi Mazumder

(57) ABSTRACT

The present application provides a method of displaying virtual content. The method includes: capturing a first image including a first marker; determining a display region corresponding to a first interaction device based on the first marker in the first image and displaying the first virtual object; displaying second virtual object corresponding to the first virtual object. The first marker is arranged on the first interaction device. A first display position of the first virtual object in a virtual space corresponds to the display region. A second display position of the second virtual object in the virtual space corresponds to a predefined superimposing region, and the second virtual object is at least a part of the first virtual object.

20 Claims, 9 Drawing Sheets

(56) References Cited

U.S. PATENT DOCUMENTS

| | | | |
|---|---|---|---|
| 2019/0004683 A1* | 1/2019 | Pahud | G06F 3/0346 |
| 2019/0005838 A1* | 1/2019 | Yu | G06F 3/011 |
| 2019/0227764 A1* | 7/2019 | Liu | G06F 3/0484 |
| 2019/0272674 A1* | 9/2019 | Comer | G06F 3/012 |
| 2019/0371076 A1* | 12/2019 | Douxchamps | G06F 3/011 |

* cited by examiner

AUGMENTED REALITY METHOD, SYSTEM AND TERMINAL DEVICE OF DISPLAYING AND CONTROLLING VIRTUAL CONTENT VIA INTERACTION DEVICE

CROSS REFERENCE TO RELATED APPLICATIONS

The present application is a continuation-application of International (PCT) Patent Application No. PCT/CN2019/111790 filed on Oct. 18, 2019, which claims foreign priorities of Chinese Patent Application No. 201811226295.9, filed on Oct. 18, 2018, Chinese Patent Application No. 201811226280.2, filed on Oct. 18, 2018, and Chinese Patent Application No. 201811217303.3, filed on Oct. 18, 2018, the entire contents of which are hereby incorporated by reference.

TECHNICAL FIELD

The present disclosure generally relates to the technical field of augmented reality, and in particular to a method of displaying virtual content, a system, and a terminal device.

BACKGROUND

As technology advances, intelligent computers and intelligent information has become increasingly popular. Terminal devices related to virtual reality (VR) and augmented reality (AR) gradually appear in daily life. The AR may use technologies, such as computer graphics and information visualization, to construct virtual content that may not exist in a real scene. The virtual content may then be fused with the real scene via a technology of image recognition and tracking. A display may be used to show the fusion of the virtual content with the real scene to bring a real perception experience to a user. Research interests of augmented reality may include displaying by superimposing the virtual content into an image of the real scene and controlling an interaction between the virtual content and a device.

SUMMARY OF THE DISCLOSURE

According to embodiments of the present disclosure, a method of displaying virtual content, a system, and a terminal device.

According to a first aspect, a method of displaying virtual content is provided and includes: capturing a first image including a first marker, wherein the first marker is arranged on a first interaction device; defining a display region corresponding to the first interaction device based on the first marker in the first image and displaying a first virtual object, wherein a first display position of the first virtual object in a virtual space corresponds to the display region; and displaying a second virtual object corresponding to the first virtual object, wherein a second display position of the second virtual object in the virtual space corresponds to a predefined superimposing region, and the second virtual object comprises at least a part of the first virtual object.

According to a second aspect, a system for displaying virtual content is provided and includes: a first terminal device and a first interaction device. The first interaction device is arranged with a first marker. The first terminal device includes: a camera, configured to capture a first image including the first marker; a processor, configured to define a display region corresponding to the first interaction device based on the first marker in the first image and render the first virtual object; a display module, configured to display the first virtual object and display second virtual object corresponding to the first virtual object. A first display position of the first virtual object in a virtual space corresponds to the display region. A second display position of the second virtual object in the virtual space corresponds to a predefined superimposing region, and the second virtual object is at least a part of the first virtual object.

According to a third aspect, an interaction device is provided and includes a substrate and a control panel. The control panel is arranged on the substrate, the control panel defines a touch region and a display region. A touch operation of a user is able to be performed in the touch region and detected by the interaction device. A marker is arranged in the display region.

According to a fourth aspect, a method of virtual content interaction is provided and includes: capturing an image including a marker, wherein the marker is a planar marker integrated into an interaction device; recognizing the marker in the image and determining a relative spatial position relation between the interaction device and a terminal device; rendering virtual content based on the relative spatial position relation and displaying the virtual content; and when receiving an operation instruction sent from the interaction device, controlling display of the virtual content based on the operation instruction, wherein the operation instruction is generated when the interaction device detects the touch operation in the touch region.

According to a fifth aspect, a method of displaying virtual content is provided and includes: capturing a first image including a first marker, wherein the first marker is arranged on a first interaction device; defining a display region corresponding to the first interaction device based on the first marker in the first image and displaying the first virtual object, wherein a display position of the first virtual object in a virtual space corresponds to the display region; acquiring a selection instruction; and selecting second virtual object from the first virtual object based on the selection instruction and displaying the second virtual object.

According to a sixth aspect, a terminal device is provided and includes: a non-transitory memory and a processor. The non-transitory memory is coupled with the processor, a computer program is stored in the non-transitory memory, and the processor is arranged to execute the above-mentioned method.

According to seventh aspect, a computer-readable non-transitory memory is provided. A program code is stored in the computer-readable non-transitory memory and may be invoked by the processor to perform the above-mentioned method.

BRIEF DESCRIPTION OF THE DRAWINGS

FIG. 1B is a scenario of performing a touch operation in a touch region of an interaction device according to another embodiment of the present disclosure.

DETAILED DESCRIPTION

In order to allow skilled in the related art to understand the solution of the present disclosure better, technical solutions of embodiments of the present disclosure will be clearly described in full details by referring to drawings of the embodiments of the present disclosure.

Figure 1:
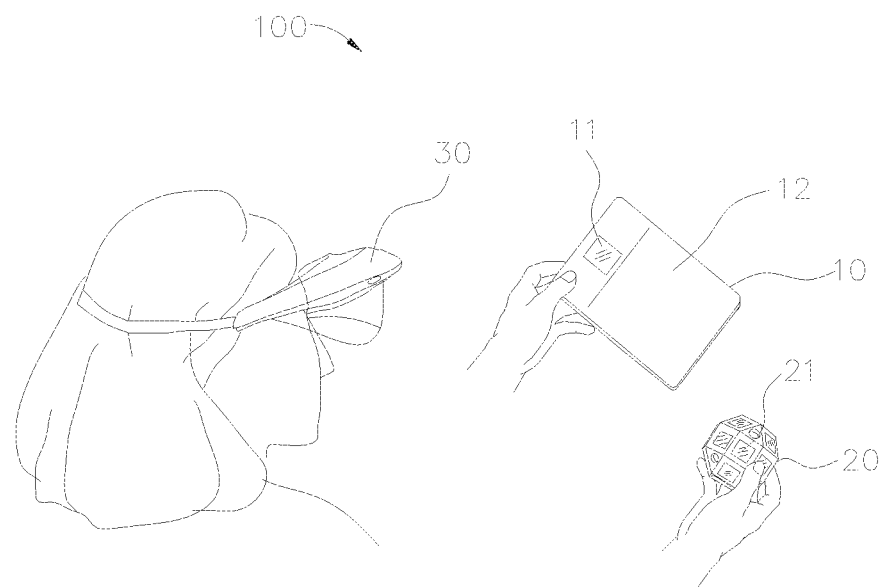
FIG. 1 is a display system of virtual content according to an embodiment of the present disclosure.
Figure 2:
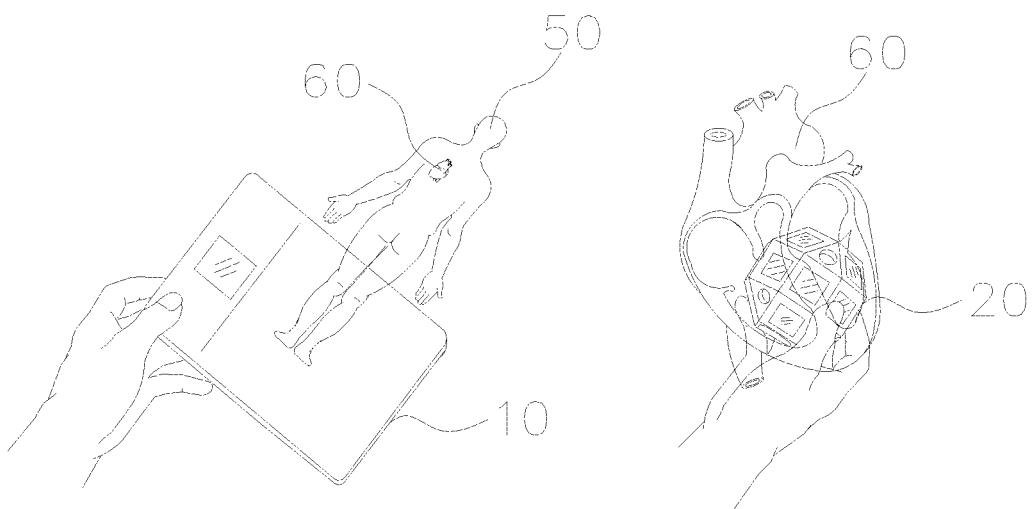
FIG. 2 is a scenario of the display system displaying a first virtual object and second virtual object according to an embodiment of the present disclosure.

As shown in FIG. 1 and FIG. 2, an embodiment of the present disclosure may provide an augmented reality system 100, including a first interaction device 10, a second interaction device 20, and a terminal device 30. The first interaction device 10 may include a control panel, the control panel may be arranged with a first marker 11 and may define a display region 12. The number of the first marker 11 arranged on the control panel 10 may be one or more. The terminal device 30 may capture a first image containing the first marker 11 to obtain position and pose of the first marker 11 relative to the terminal device 30. Based on the position and pose, a first virtual object 50 may be displayed, and a display position of the first virtual object 50 may correspond to the display region 12 of the first interaction device 10. A user may use the terminal device 30 to observe the first virtual object 50 superimposed onto the display region 12 of the first interaction device 10 in a real scene. Image data corresponding to the first virtual object 50 may be stored in the terminal device 30 in advance, or acquired from a server or other terminals. The user may select the virtual content to be displayed via the terminal device 30 or the first interaction device 10.

As an implementation, the first interaction device 10 may be hold by hand of a user or fixedly placed on an operation platform, such that the user may manipulate the first interaction device 10 and observe the virtual content. The first interaction device 10 may further define a touch region, and the user may perform touch operations in the touch region to control the displayed virtual object. The touch region may be defined in correspondence with the display region 12, or defined at areas of the first interaction device 10 other than the display region 12. The first interaction device 10 may detect the touch operation performed in the touch region to generate an operation instruction corresponding to the touch operation, and send the operation instruction to the terminal device 30. When the terminal device 30 receives the operation instruction sent from the first interaction device 10, the terminal device 30 may control the first virtual object based on the operation instruction, such as control the first virtual object to rotate, to displace, to be switched, or the like.

In one embodiment, the second interaction device 20 may be arranged with a second marker 21. The second interaction device 20 may be a polyhedron. Each face of the polyhedron is arranged with a second marker, that is, the polyhedron is arranged with a plurality of second markers. In such a way, the second interaction device 20 may be rotated to any angle, and at least one second marker 21 may be able to be captured by the terminal device 30. The terminal device 30 may capture a second image containing the second marker 21 to obtain a selection instruction. The terminal device 30 may select a second virtual object 60 from the first virtual object 50 based on the selection instruction and display the second virtual object 60.

As shown in FIG. 2, a user wearing the head-mounted device may observe the first virtual object 50, that is a three-dimensional medical anthropomorphic phantom, superimposed on the first interaction device 10, and may select a portion of the three-dimensional medical anthropomorphic phantom via the second interaction device 20. For example, a heart of the three-dimensional medical anthropomorphic phantom may be selected, and a three-dimensional model of the heart may be displayed as the second virtual object 60. As an implementation, the second virtual object 60 selected by the user via the second interaction device 20 may follow the second interaction device 20, and may be superimposed onto a position corresponding to the second interaction device 20. The user may observe, via the terminal device 30, that the virtual three-dimensional model of the heart displaces and rotates following a position change and a pose change of the second interaction device 20. The first virtual object may be selected by the user at will to be displayed or switched. For example, besides the medical anthropomorphic phantom, the first virtual object may also be a model of a machine, an artistic exhibition, a book, a game character, or the like; correspondingly, the second virtual object may be a component of the machine, a portion of the artistic exhibition, a page of the book, an equipment of the game character, or the like.

The terminal device 30 may be a head-mounted device, a mobile phone, a tablet or the like. The head-mounted device may be an integral head-mounted display, or a head-mounted device connected to an external processor or an external non-transitory memory. The terminal device 30 may be a smart terminal, such as a mobile phone, which may be connected to or plugged with an external head-mounted display.

Figure 3:
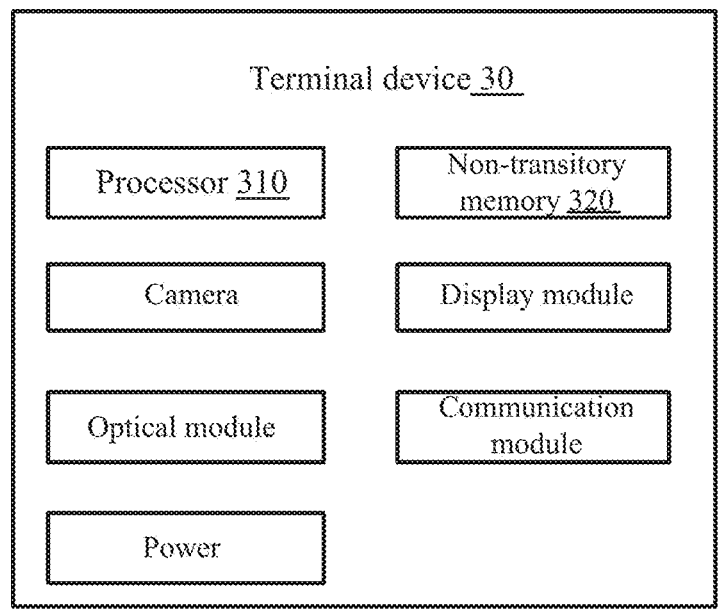
FIG. 3 is a structural diagram of a terminal device according to an embodiment of the present disclosure.

As shown in FIG. 3, the terminal device 30 may include a processor 310 and a non-transitory memory 320. The non-transitory memory 320 may store one or more computer programs. The one or more computer programs may be executed by the processor 310 to perform the method provided according to embodiments of the present disclosure.

The processor 310 may include one or more processor cores. The processor 310 may use various interfaces and lines to connect various components of the entire terminal device 30. By running or executing an instruction, a program, a code set, or an instruction set which may be stored in the non-transitory memory 320, and by invoking data stored in the non-transitory memory 320, various functions of the electronic device 100 may be performed, and data may be processed. The processor 310 may be realized in at least one form of hardware including a digital signal processor (DSP), a field-programmable gate array (FPGA), and a programmable gate array (PLA). The processor 310 may integrate at least one of a central processing unit (CPU), a graphics processing unit (GPU), a modem, and the like, or a combination thereof. The CPU may substantially handle an operating system, a user interface, applications, and the like. The GPU may be arranged to render and draw display content. The modem may be arranged to handle with wireless communication. The modem may be realized as a communication chip independently, instead of being integrated into the processor 310.

The non-transitory memory 320 may include a random access memory or a read-only memory. The non-transitory memory 320 may be configured to store an instruction, a program, a code, a code set, or an instruction set. The non-transitory memory 320 may include a program storage area and a data storage area. The program storage area may store an instruction to implement an operating system, an instruction to perform at least one function (such as a touch, an audio display function, an image display function, and the like), an instruction to perform various methods as described in embodiments hereafter, and the like. The data storage area may store data generated during usage of the terminal device 30.

In some embodiments, the terminal device 30 may further include a camera, configured to capture a real scene and an image of an object. The camera may be an infrared camera or a visible light camera, which will not be limited herein.

In one embodiment, the terminal device 30 may be a head-mounted display. The terminal device 30 may further include one or more of following components: a display module, an optical module, a communication module, and a power. The display module may include a display control unit, configured to receive an image of virtual content after rendering and project the image onto the optical module, such that the user may observe the virtual content via the optical module. The display module may be a display screen or a projection apparatus for displaying the image. The optical module may use an off-axis optical system or a waveguide optical system, and the displayed image displayed by the display module may be projected to eyes of the user through the optical module. In some implementations, the user may observe a real environment through optical module, having a visual effect of the virtual content superimposed onto the real environment. The communication module may be a bluetooth, Wireless Fidelity (Wi-Fi), ZigBee, or other modules. The terminal device may communicate with and connect to an interactive device through the communication module to perform interaction of messages and instructions. The power may supply power to the entire terminal device, ensuring that all components of the terminal device may operate normally.

Figure 4:
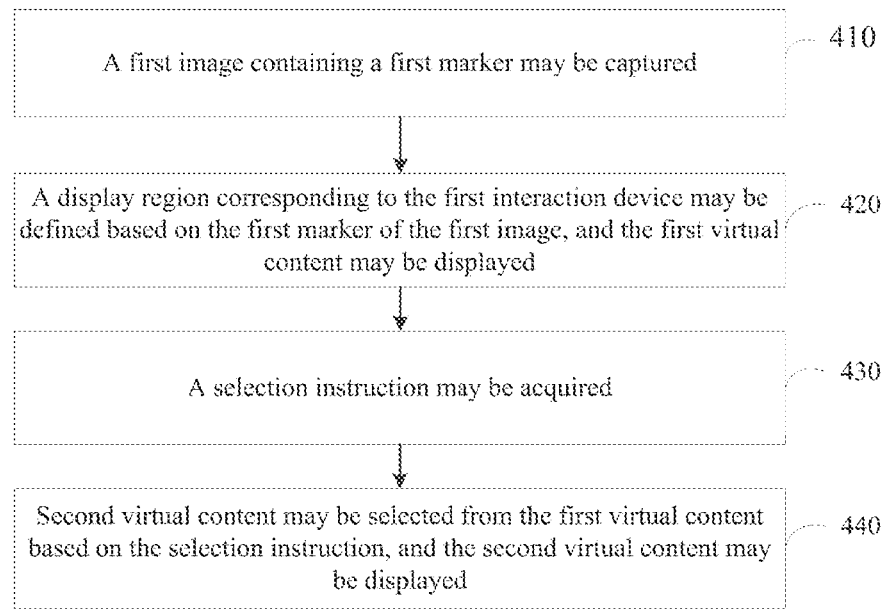
FIG. 4 is a flow chart showing a method of displaying virtual content according to an embodiment of the present disclosure.

Embodiments of the present disclosure may provide a method of displaying virtual content. The method may be performed by the terminal device of the augmented reality system. As shown in FIG. 4, in one embodiment, the method may include following operations.

At block 410, a first image containing a first marker may be captured.

The first marker may refer to a marker arranged on a control panel of a first interaction device. The terminal device may recognize the first marker and determine first position and pose of the first interaction device relative to the terminal device.

In some embodiments, the first marker may be adhered on a surface of the control panel of the first interaction device or integrated within the first interaction device. For example, the first marker may be a pattern fixed on the control panel of the first interaction device. Alternatively, when the first interaction device has a screen, the pattern representing the first marker may be displayed on the screen. In other examples, the first marker may be a visible light spot, an infrared light spot, or the like, with the proviso of being able to be tracked. The present disclosure does not limit representation or a form of the first marker.

In some implementations, the first interaction device may be arranged with a plurality of markers to achieve various functions. For example, some of the plurality of markers may be recognized by the terminal device, such that the terminal device may track the first interaction device to improve accuracy of tracking. Some of the plurality of markers may be arranged to bind with the virtual content for the terminal device to recognize and display.

At block 420, a display region corresponding to the first interaction device may be determined based on the first marker of the first image, and the first virtual object may be displayed. A first display position of the first virtual object may correspond to the display region.

The first display position of the first virtual object in a virtual space may correspond to the display region of the first interaction device in a real space. The user may observe, via the terminal device, the first virtual object superimposed onto the display region of the first interaction device.

As an implementation, the terminal device may recognize the first marker and acquire position and pose of the first marker relative to the terminal device. Based on the position of the first marker on the first interaction device, relative position and pose between the terminal device and the first interaction device, and relative position and pose between the terminal device and regions of the first interaction device other than the display region may be determined.

The display region corresponding to the first interaction device may be a region defined on the control panel of the first interaction device to display the virtual content in augmented reality method. The terminal device may determine a position relation between the first marker and the display region of the control panel based on the position of the first marker on the first interaction device, such that a first spatial position of the display region relative to the terminal device may be determined. Based on the first spatial position, the first virtual object may be superimposed onto the display region.

In one embodiment, the display region corresponding to the first interaction device may be a region in a real space defined out of the control panel. For example, the display region may be a particular spatial region above the first interaction device, or a particular spatial region in front of the first interaction device relative to the user.

In some implementations, the terminal device may recognize the first marker in the first image, obtain virtual image data corresponding to identity of the first marker, and generate the first virtual object based on the virtual image data. The virtual image data may include data for modeling, such as vertex data, color data, pattern data, and the like.

Each first marker may have a unique identity and correspond to a unique type of the first virtual object, therefore, different the first virtual object corresponding to different first markers may be displayed. For example, one first marker may have the identity of "Serial Number 1", and a three-dimensional vehicle may be displayed as the first virtual object correspondingly. Another first marker may have the identity of "Serial Number 2", and a three-dimensional building may be displayed as the first virtual object correspondingly.

In one implementation, the virtual image data of the first virtual object may be stored in the terminal device in advance. No matter what the identity of the recognized first marker is, the first virtual object stored in the terminal device in advance may be displayed only. Alternatively, the virtual image data of the first image content may be stored in cache memories of various applications correspondingly. When the terminal device activates different applications, different types of the first virtual object may be displayed. For example, a first marker may correspond to different content for different applications, activation of an application A may lead to display a three-dimensional vehicle, and activation of an application B may lead to display a three-dimensional building.

Figure 5:
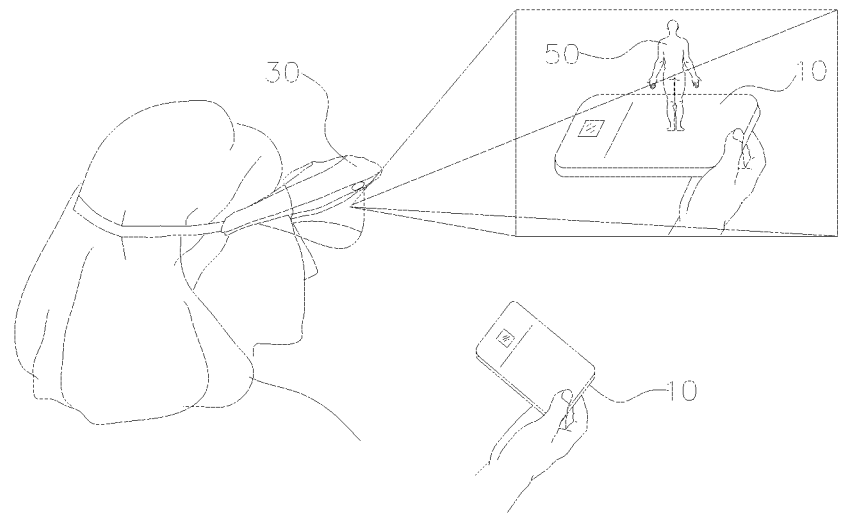
FIG. 5 is a scenario of displaying a first virtual object according to an embodiment of the present disclosure.

As shown in FIG. 5, the terminal device 30 may be an integral head-mounted display. The user may observe the first interaction device 10 via the head-mounted display, and observe the first virtual object 50 displayed at a position corresponding to the display region of the first interaction device 10. The first virtual object may be the three-dimensional medical anthropomorphic phantom.

At block 430, a selection instruction may be acquired.

The selection instruction may instruct the terminal device to select the second virtual object from the first virtual object. The user may perform selection via the terminal device, the first interaction device or the second interaction device, thereby generating the selection instruction. In some implementations, the terminal device may acquire the selection instruction by recognizing an action of the user, when the terminal device detects that the action of the user is the same as a predefined action, the selection instruction may be acquired. The terminal device may further detect the user's gaze direction to acquire the selection instruction. When the user is watching towards a position at which the second virtual object of the displayed the first virtual object is located, the second virtual object may be selected.

At block 440, the second virtual object may be selected from the first virtual object based on the selection instruction, and the second virtual object may be displayed.

Figure 6:
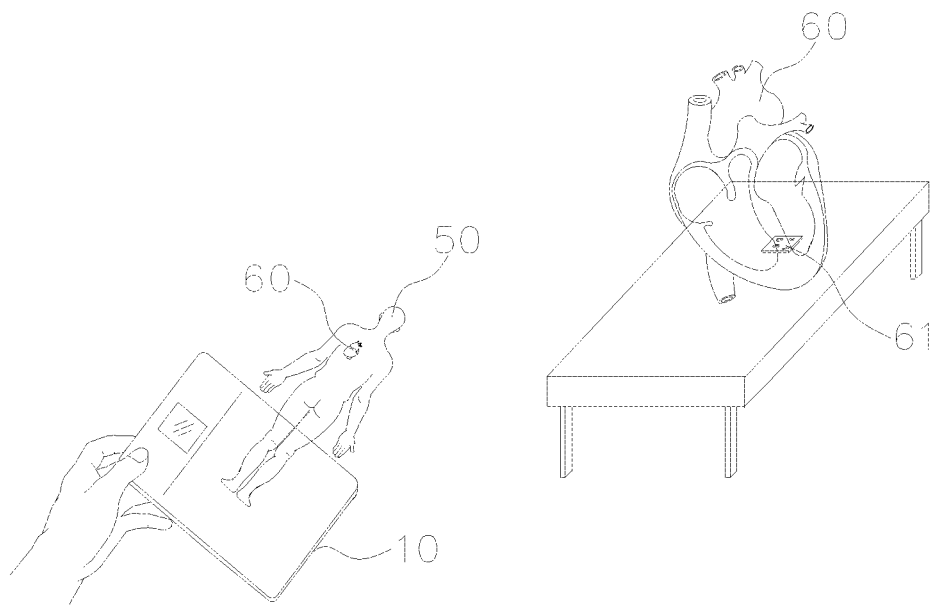
FIG. 6 is a scenario of displaying a first virtual object and a second virtual object according to an embodiment of the present disclosure.

The second virtual object may be the entire first virtual object or a portion of the first virtual object. The terminal device may acquire a second display position of the second virtual object in the virtual space. The second display position may indicate a position onto which the second virtual object may be superimposed in a real scene. The terminal device may recognize another marker arranged in a real scene, such as a marker arranged on the ground or on a surface of a booth, and display the second virtual object based on the another marker. As shown in FIG. 6, the terminal device may recognize a third marker 61 arranged on a surface of a desk and determine relative position and relative pose between the terminal device and the third marker 61. Based on a position relation between a predefined superimposing region and the third marker, a second spatial position of the superimposing region relative to the terminal device may be determined. The superimposing region may be a region of which the second virtual object is to be superimposed. The three-dimensional model of the heart 60 of the three-dimensional medical anthropomorphic phantom 50 may be displayed in the superimposing region. In some implementations, the user may perform operations in the touch region of the first interaction device or manipulate the second interaction device 20 to allow the second virtual object to be displayed in the superimposing region. As an implementation, the user may perform operations to change a display status of the first virtual object, and a display status of the second virtual object may also be changed corresponding to the change of the display status of the first virtual object.

Figure 7:
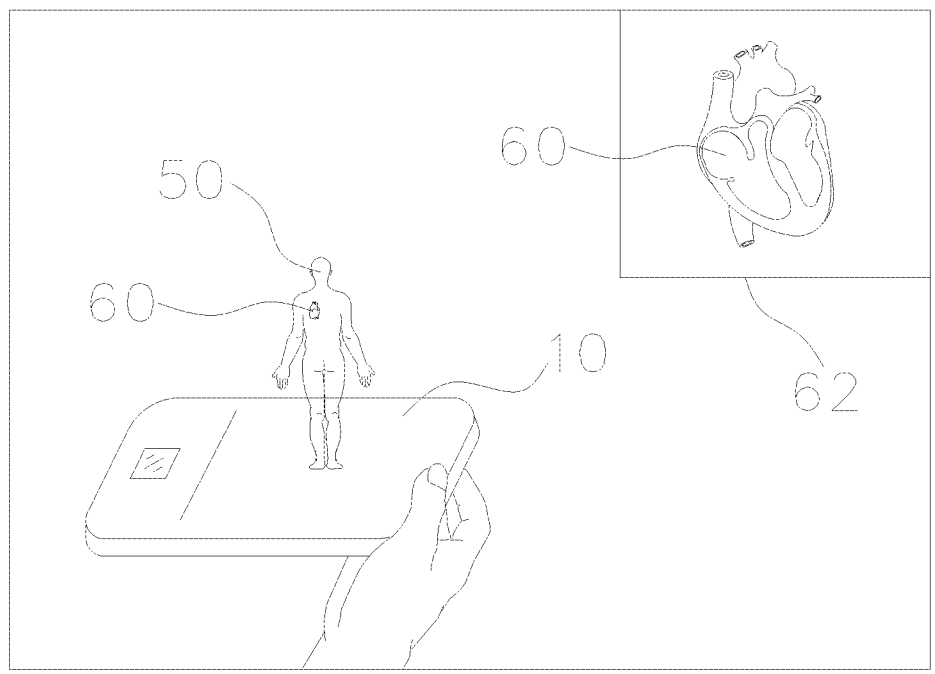
FIG. 7 is a scenario of displaying a first virtual object and a second virtual object according to another embodiment of the present disclosure.

In some implementations, the second display position of the second virtual object in the virtual space may be related to the first display position of the first virtual object. As shown in FIG. 7, the terminal device may define a virtual display region 62 in the virtual space to independently display the second virtual object 60. The virtual display region 62 may be related to rendering coordinates of the first virtual object 50, and the second virtual object 60 may be rendered in the virtual display region 62. The second virtual object 60 may be superimposed onto right-top of a field of view of the terminal device 30 all the time.

In some implementations, the second display position of the second virtual object in the virtual space may be related to the first interaction device. For example, a region at 2 meters in front of the control panel may be defined as the superimposing region for the second virtual object.

In some implementations, a size of the displayed second virtual object may be equal to a size of the second virtual object within the first virtual object. Alternatively, the second virtual object that is still within the first virtual object may be zoomed in or zoomed out firstly, and then displayed on its own.

In an application scenario of an embodiment, the first virtual object may be a vehicle. The user may select a vehicle door, a tyre, a motor, or other parts as the second virtual object to be displayed separately. Further, the vehicle parts may be zoomed in or zoomed out for the user to observe details of the parts to understand an internal structure of the vehicle. When the first virtual object is three-dimensional modeling data obtained by physically scanning a malfunctional vehicle, malfunctional components may be easily checked.

Figure 8:
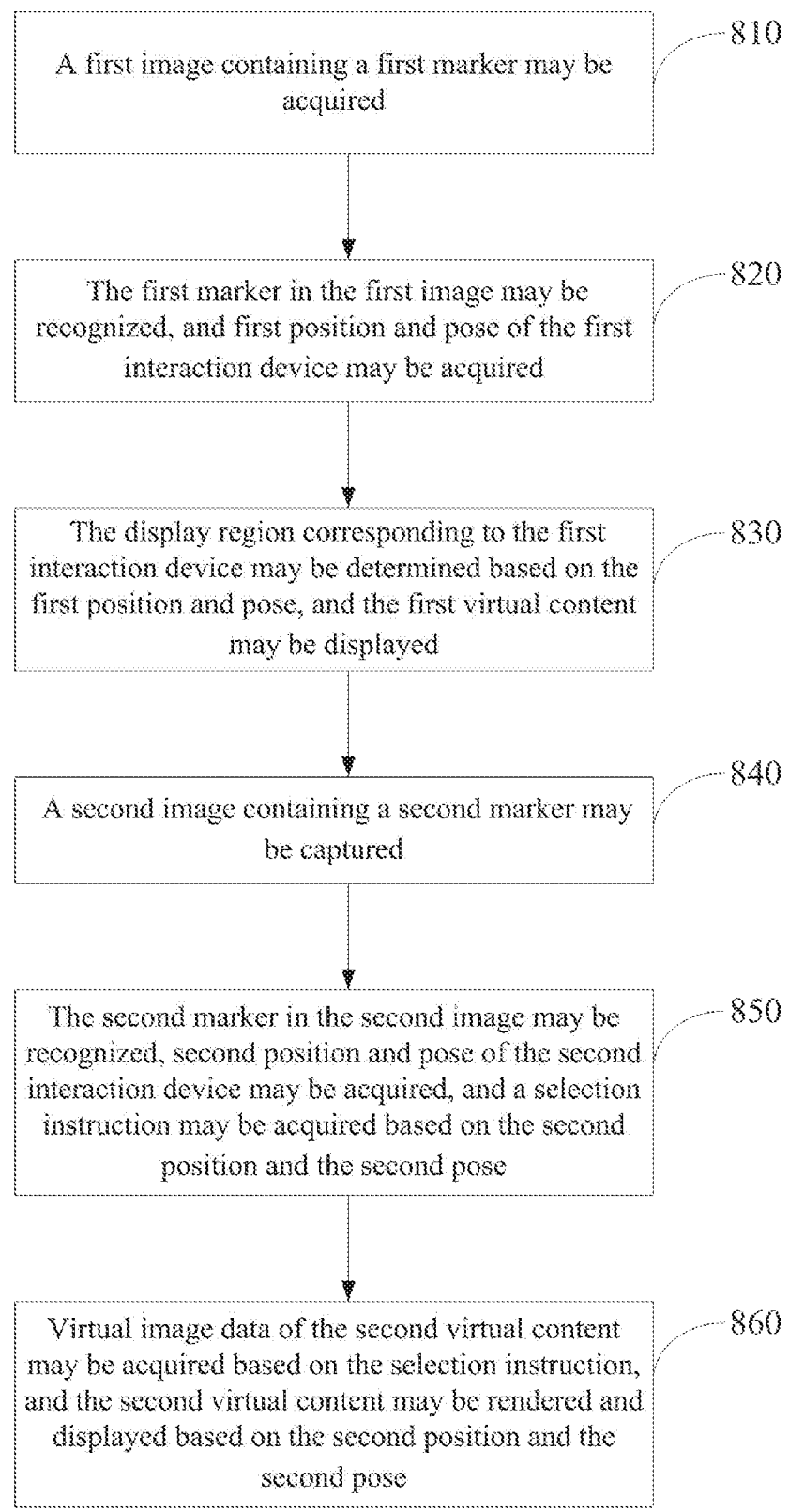
FIG. 8 is a flow chart showing a method of displaying virtual content according to another embodiment of the present disclosure.

As shown in FIG. 8, another method of displaying virtual content may be provided according to the embodiments of the present disclosure. The method may be performed by the terminal device of the augmented reality system. The method may include following operations.

At block 810, a first image containing a first marker may be acquired.

At block 820, the first marker in the first image may be recognized, and first position and pose of the first interaction device may be acquired.

At block 830, a display region corresponding to the first interaction device may be determined based on the first position and pose, and the first virtual object may be displayed.

A first spatial position of the display region relative to the terminal device may be determined based on a position of the display region corresponding to the first interaction device. Coordinate transformation may be performed to the first spatial position of the display region to obtain rendering coordinates of the first virtual object. The rendering coordinates may indicate a first display position of the first virtual object in the virtual space. The first virtual object may be rendered and displayed based on the rendering coordinates, such that the first virtual object may be superimposed onto the display region corresponding to the first interaction device.

In some implementations, the position of the display region corresponding to the first interaction device may include a relative position relation between the display region and the first marker. The position of the display region may be stored in the terminal device in advance. Alternatively, the terminal device may capture an image containing the first interaction device, recognize the first interaction device in the image, and define the display region of the first interaction device based on a predefined region-defining rule, such that the position of the display region may be determined. The predefined region-defining rule may define an area of the display region, the position of the display region relative to the first interaction device, a ratio of the area of the display region to a total area of the first interaction device, and the like. For example, a region occupying 50% of the total area of the first interaction device and at a right side of the first interaction device relative to the user may be defined as the display region, or an entire surface of the first interaction device but excluding an area arranged with the marker and an area for touching may be defined to be the display region, or an entirety of the first interaction device may be defined to be the display region, or a region at which the first marker is arranged may be defined to be the display region, or any other space related to the first interaction device may be defined as the display region.

At block 840, a second image containing a second marker may be captured.

The second marker may be a marker arranged on a second interaction device. The second interaction device may be a hand stick, a polyhedron controller, or the like.

At block 850, the second marker in the second image may be recognized, second position and pose of the second interaction device may be acquired, and a selection instruction may be acquired based on the second position and pose.

In some implementations, the terminal device may acquire the second position and pose of the second interaction device relative to the terminal device based on the second marker in the second image, such that spatial coordinates of the second interaction device in the virtual space may be acquired.

In one embodiment, the terminal device may render and display a virtual indicator based on the second position and the second pose of the second interaction device. The virtual indicator may represent a direction indicated by the second interaction device. The virtual indicator may be a virtual arrow or a virtual ray extending along a pointing direction of the second interaction device. When the terminal device detects that the virtual indicator in the virtual space is pointing towards the second virtual object in the first virtual object, the selection instruction corresponding to the second virtual object may be generated. As an implementation, each component of the first virtual object may have an impact volume in the virtual space, and the virtual indicator may also have an impact volume in the virtual space. When the terminal device detects that the virtual indicator intersects with a portion of the first virtual object, or an end of the virtual indicator collides with a portion of the first virtual object, the virtual indicator may be determined as pointing towards the portion of the first virtual object. The pointed portion may be selected as the second virtual object, and the selection instruction corresponding to the second virtual object may be generated.

Figure 9:
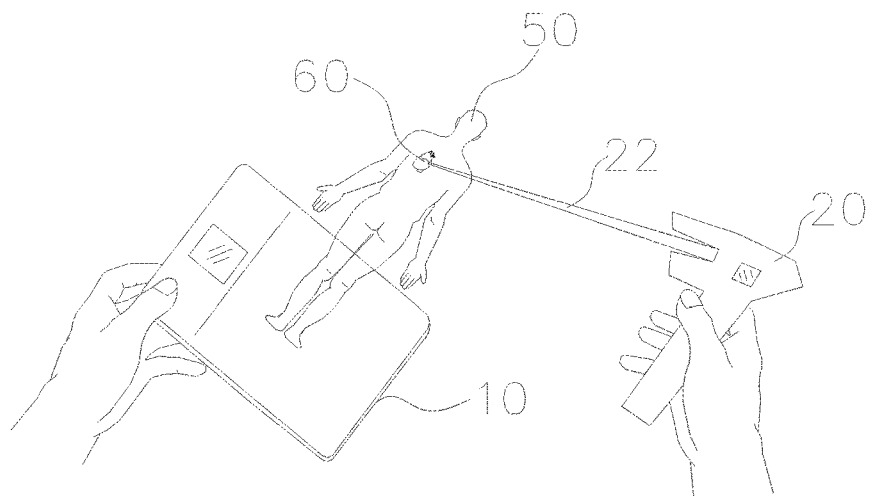
FIG. 9 is a scenario of using a second interaction device to select a second virtual object according to an embodiment of the present disclosure.

In an application scenario, as shown in FIG. 9, a virtual ray 22 corresponding to the second interaction device 20 may be shown in the virtual space, the virtual ray 22 may be the virtual indicator extending along a direction indicated by the second interaction device 20. When the virtual ray 22 is pointing towards the heart of the three-dimensional medical anthropomorphic phantom 50, the selection instruction may be generated, and the three-dimensional model of the heart 60 may be selected as the second virtual object. The second interaction device 20 may be a handle, an emitting end of the virtual ray 22 may be connected to an end or an opening of the handle, and the virtual ray 22 may extend along a pointing direction of the handle. As an implementation, the user may change the position and pose of the second interaction device by moving or rotating the second interaction device, such that coordinates and the pointing direction of the virtual indicator in the virtual space may be changed, and the virtual content may be selected based on user's demand. In some implementations, the second interaction device may be arranged with an inertial measurement unit (IMU) to facilitate detection of the position and pose of the second interaction device.

In an embodiment, the terminal device may determine whether the second interaction device and the first virtual object are at least partially overlapped based on the second position and pose of the second interaction device, that is, whether the spatial coordinates of the second interaction device are overlapping with the rendering coordinates of the first virtual object. The terminal device may select the second virtual object based on a projection of the second interaction device in the virtual space, the projection may have an impact volume. In an embodiment, the terminal device may acquire the spatial coordinates of the second interaction device in the virtual space and determine whether the spatial coordinates of the second interaction device is covered by the rendering coordinates of the first virtual object. The spatial coordinates of the second interaction device being covered by the rendering coordinates of the first virtual object may indicate that the second interaction device and the first virtual object are partially overlapped, a component in an overlapped region may be selected as the second virtual object, and the selection instruction may be generated correspondingly.

Figure 10:
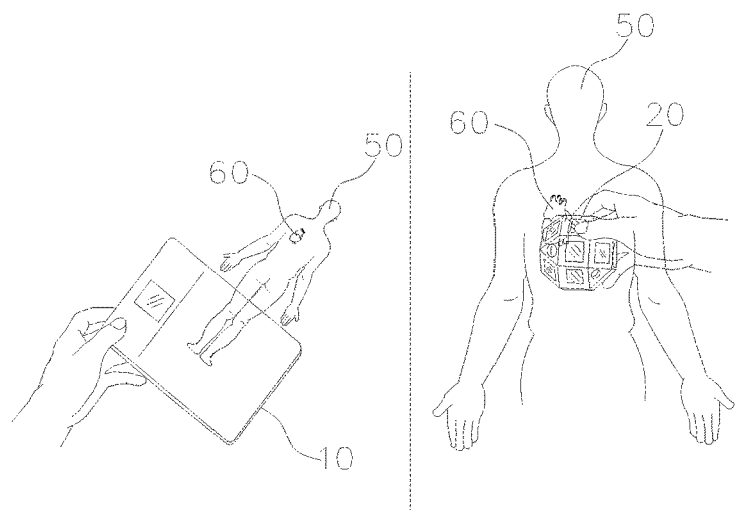
FIG. 10 is a scenario of using a second interaction device to select a second virtual object according to another embodiment of the present disclosure.

In some embodiments, an area of the display region defined on the first interaction device 10 may be limited. The displayed first virtual object 50 may be relatively small, and selecting a more detailed second virtual object 60 from the first virtual object 50 may be difficult. As shown in FIG. 10, the first virtual object 50 may be projected to be displayed to another position in a real scene and zoomed in, and the second virtual object 60 of the first virtual object 50 which is zoomed in may be selected accurately via the second interaction device 20.

In some implementations, when selecting the second virtual object, confirmation of the second virtual object may be performed. For example, an option of confirmation may be shown to the user, such that the user may operate to confirm the selection of the second virtual object. Alternatively, the selection of the second virtual object may be confirmed by operating a physical button provided on the second interaction device.

At block 860, virtual image data of the second virtual object may be acquired based on the selection instruction, and the second virtual object may be rendered and displayed based on the second position and pose and the virtual image data.

The terminal device may determine the second virtual object to be selected based on the selection instruction. The virtual image data of the second virtual object may be acquired. The second virtual object may be rendered and displayed based on the virtual image data and the second display position of the second virtual object in the virtual space.

In some embodiments, the second display position of the second virtual object may be related to the second position and pose of the second interaction device. The display position of the second virtual object may be changed as the second interaction device moves, the display angle of the second virtual object may be changed as the pose of the second interaction device changes. When the second position and pose changes, the terminal device may re-render the second virtual object based on the changed second position and pose, and the second virtual object at a corresponded perspective may be displayed.

As an implementation, the user may change the second position and pose of the second interaction device by moving and/or rotating the second interaction device. Alternatively, the second position and pose of the second interaction device may be changed as the user wearing the terminal device 30 moves and changes postures around the second interaction device having fixed position and pose. In such a way, images showing the second virtual object from various positions and directions may be observed.

In one embodiment, while the second virtual object is being displayed, the displayed virtual content may be switched at anytime. The terminal device may acquire a content switching instruction to switch the displayed second virtual object into another portion of the first virtual object.

The content switching instruction may be acquired by various means, such as via the terminal device, via the first interaction device, by pressing a physical button of the second interaction device, to switch the displayed second virtual object displayed at present. For example, when a position change or a pose change of the second interaction device is detected to exceed a certain value, the second virtual object displayed at present may be switched. Further, for example, when the virtual indicator emitted from the second interaction device points towards another portion of the first virtual object, or when the second interaction device overlaps with another portion, the content switching instruction may be generated. In an example, each portion of the first virtual object may be serially numbered in advance, when the content switching instruction is received, the second virtual object displayed at present may be switched into a virtual portion having a serial number behind the second virtual object.

In some embodiments, the terminal device may track a third marker arranged in a real scene. Relative spatial position between the third marker and the terminal device, including relative position and pose, may be acquired. A second spatial position of the superimposing region relative to the terminal device may be determined based on the relative spatial position and a position relation between a predefined superimposing region and the third marker. Coordinate transformation may be performed to the second spatial position to obtain the rendering coordinates of the second virtual object in the virtual space. The second virtual object may be rendered and displayed. As shown in FIG. 6, the three-dimensional model of the heart 60 of the three-dimensional medical anthropomorphic phantom 50 may be superimposed onto the superimposing region related to the third marker 61.

In some embodiments, the first interaction device may define a touch region. A touch operation of the user in the touch region of the first interaction device may be detected, and an operation instruction corresponding to the touch operation may be generated. The terminal device may receive the operation instruction sent from the first interaction device, and control the display of the first virtual object and the second virtual object accordingly.

As an implementation, display of the second virtual object may be synchronous with display of the first virtual object. The control panel of the interaction device may define two different touch regions, one touch region corresponding to the first virtual object and the other touch region corresponding to the second virtual object. Each of the two different touch regions may allow operations to control the display of the first virtual object and the display of the second virtual object, respectively.

In some implementations, the touch operation may include, but not be limited to, operations applied to the touch region, such as a single finger sliding, a click, a press, a multi-finger sliding. The touch operation may be arranged to control the display of the virtual content, such as controlling the virtual content to be rotated, to be zoomed in, to be zoomed out, and to perform specific animation, switching the virtual content displayed at present into new virtual content, and adding new virtual content into a present augmented reality scene.

Figure 11A:
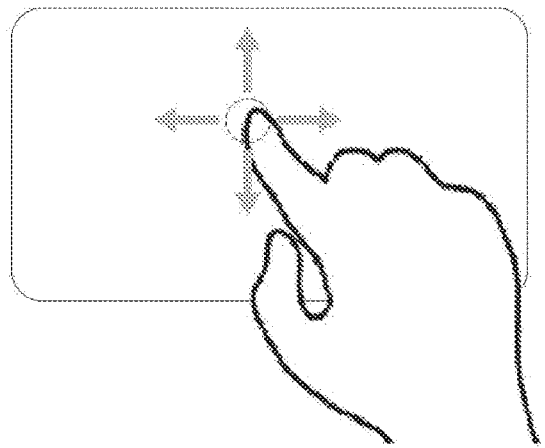
FIG. 11A is a scenario of performing a touch operation in a touch region of an interaction device according to an embodiment of the present disclosure.
Figure 11B:
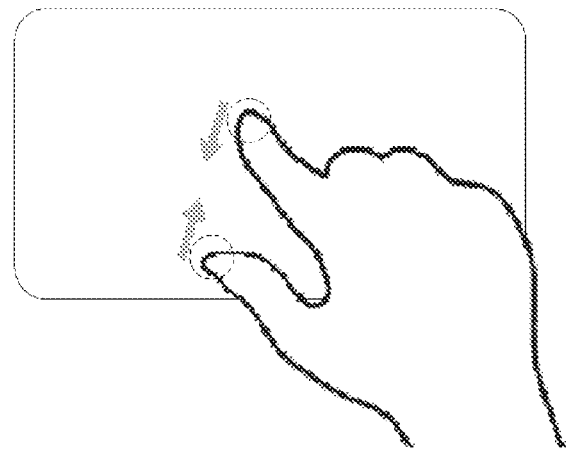
FIG. 11C is a scenario of performing a touch operation in a touch region of an interaction device according to still another embodiment of the present disclosure.
Figure 11C:
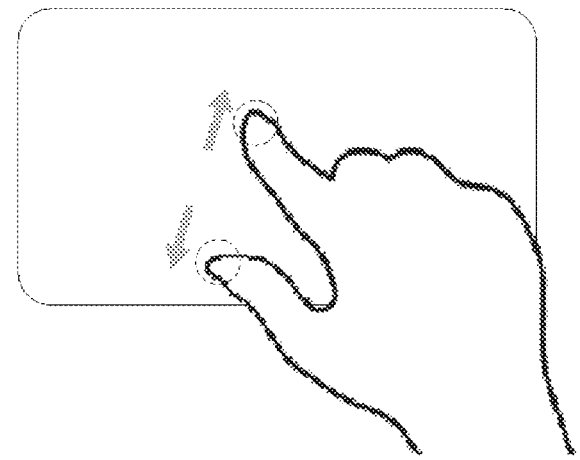

As shown in FIG. 11A, when the first interaction device detects that the touch operation performed in the touch region is a single-finger sliding to a left or a right relative to the user, new virtual content may be switched to be displayed based on the operation instruction, for example, a virtual lamp displayed at a present moment may be switched into a virtual architectural model, a virtual vehicle, or other new virtual content. When the touch operation is the single-finger sliding to a top or a bottom of the first interaction device relative to the user, the virtual content may be adjusted based on the operation instruction, for example, light intensity or color of the light of the virtual lamp may be adjusted. As shown in FIGS. 11B and 11C, when the touch operation is two fingers moving towards each other, the virtual content displayed at the present moment may be zoomed out based on the operation instruction. When the touch operation is two fingers moving away from each other, the virtual content displayed at the present moment may be zoomed in based on the operation instruction.

In some implementations, based on different virtual content, a same operation instruction may correspond to different control effects. After the terminal device acquires the operation instruction, a corresponding control instruction may further be generated based on a type of the virtual content displayed at the present moment, such that the virtual content may be controlled to show a corresponding control effect. For example, when the virtual content is a vehicle, the touch operation performed in the touch region is detected to be a sliding towards a left relative to the user, a control instruction for opening a door of the vehicle may be generated. When the touch operation performed in the touch region is detected to be a sliding towards a right relative to the user, a control instruction for closing the door of the vehicle may be generated. When the touch operation performed in the touch region is detected to be a double clicking, a control instruction for switching on a light of the vehicle may be generated.

Figure 12:
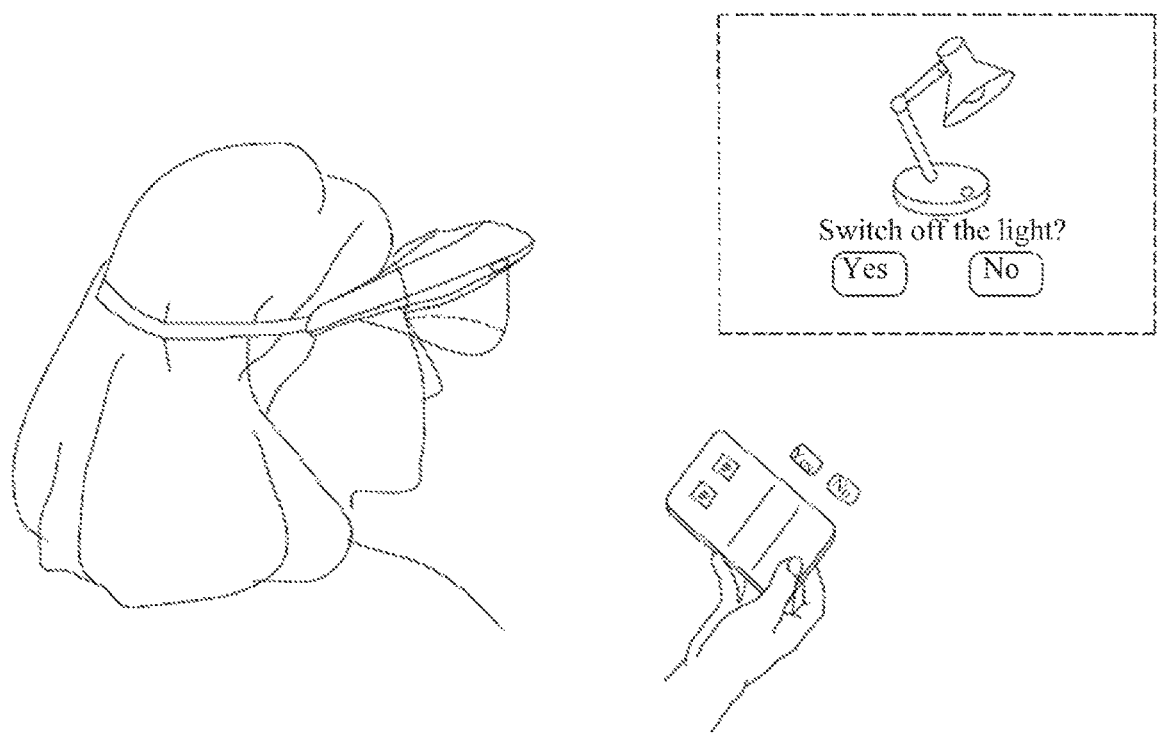
FIG. 12 is a scenario of interaction between an interaction device and a virtual interaction interface according to an embodiment of the present disclosure.

In some implementations, the virtual content may include a virtual interaction interface. The touch region may be divided into various sub-regions based on the virtual interaction interface. Each of the various sub-regions may correspond to each virtual option included in the virtual interaction interface. The virtual interaction interface may be in a form of a button, a pop-up window, a list, or the like, and will not be limited herein. When the first interaction device detects the touch operation at the various sub-regions, the terminal device may generate corresponding interaction instructions, such that corresponding virtual options may be clicked. For example, as shown in FIG. 12, the first virtual object displayed by the terminal device is a lamp, and the virtual interaction interface may be displayed at the same time. The virtual interaction interface shows "if needs to switch off the lamp", and a button for selecting "yes" and a button for selecting "no". The touch region may include a first sub-region corresponding to selection of "yes" and a second sub-region corresponding to selection of "no". When the touch operation is detected as being performed in the first sub-region, the "yes" is selected, and an effect of lamp-off may be shown. When the touch operation is detected as being performed in the second sub-region, the "no" is selected, and the lamp may remain as light on.

In some implementations, more than one terminal devices are arranged, including a first terminal device and at least one second terminal device. The first terminal device may share data with the at least one second terminal device in a surrounding environment by a Wi-Fi network, a Bluetooth, a near field communication, or the like, such that a user wearing a second terminal device without manipulating the first interaction device and the second interaction device may observe corresponding virtual content. The virtual image data sent from the first terminal device to the second terminal device may include model data of the second virtual object. The model data may be used by the second terminal device to render and display the second virtual object in the virtual space. The model data may include a color for generating a model corresponding to the second virtual object and coordinates of each vertex of the model. In an embodiment, the virtual image data may further include a sharing instruction to instruct the second terminal device to capture an image containing a third marker, recognize the third marker, and acquire relative spatial position information of a display region corresponding to the third marker to display the second virtual object.

As the at least one second terminal device may be arranged at various positions, a mode of sharing the displayed virtual content may include a mode of close-range sharing and a mode of remote sharing.

In one embodiment, when the first terminal device connected to the first interaction device and the at least one second terminal device are located in a same real scene, all terminal devices may recognize a same third marker arranged in the real scene. The first terminal device may determine a superimposing region of the second virtual object in a real space by recognizing the third marker in the real scene, and the second virtual object may be superimposed and displayed in the superimposing region. The virtual image data of the second virtual object may be sent to the second terminal device in the same real scene. After the second terminal device receives the virtual image data of the second virtual object, the mode of short-range sharing may be activated based on the sharing instruction of the virtual image data. The second terminal device may capture a fourth image containing the third marker, determine the superimposing region of the second virtual object in the real space based on the third marker in the fourth image, acquire a third spatial position of the superimposing region relative to the second terminal device, and perform coordinate transformation to the third spatial position to obtain the display position of the second virtual object in the virtual space. Further, the second virtual object may be rendered and displayed based on the virtual image data of the second virtual object and the display position.

In one embodiment, when the first terminal device connected to the first interaction device and the second terminal device are located in different real scenes, such as separate rooms with a long distance apart from each other. The first terminal device is arranged in a first real scene, and the at least one second terminal device is arranged in a second real scene. The first terminal device may recognize a third marker arranged in the first scene, and the at least one second terminal device may recognize a fourth marker arranged in the second scene. The third marker and the fourth marker may be different markers. When the first terminal device determines the superimposing region of the second virtual object in the first real scene by recognizing the third marker and superimposes the second virtual object onto the superimposing region for display, the virtual image data of the second virtual object may be sent to the at least one second terminal device located remotely via a server. After the at least one second terminal device receives the virtual image data of the second virtual object, the mode of remote sharing may be activated based on the sharing instruction of the virtual image data. The at least one second terminal device may capture an image containing the fourth marker, determine the superimposing region of the second virtual object in the second real scene based on the fourth marker in the image, and further determine a relative position relation between the at least one second terminal device and the superimposing region, such that the display position of the second virtual object in the virtual space may be obtained based on the relative position relation. The second virtual object may be rendered and displayed based on the virtual image data and the display position of the second virtual object.

In one embodiment, pose of the third marker and pose of the fourth marker may be related. The first terminal device may capture an image containing the third marker, and the second terminal device may capture an image containing the fourth marker. When position and pose of the third marker relative to the first terminal device is consistent with position and pose of the fourth marker relative the second terminal device, the first terminal device and the second terminal device may display the same second virtual object from a same visual angle. When the relative spatial position between the second terminal device and the fourth marker is changed, the visual angle of observing the second virtual object may also be changed. For example, when the first terminal device in the first real scene is at a first direction and position relative to the third marker, the second terminal device located at the second real scene is at a second direction and position relative to the fourth marker, and the first direction and position is different from the second direction and position, the first terminal device and the second terminal device may observe two different faces of the second virtual object, respectively.

In one embodiment, the second virtual object displayed by the remote second terminal device may be the same as the second virtual object displayed by the first terminal device in the first real scene. A plurality of terminal devices may display the second virtual object from a same visual angle. When relative spatial position between the first terminal device in the first real scene and the third marker changes to render and display the second virtual object from a different visual angle, the second terminal device may re-render the second virtual object along with the change of the relative spatial position relation of the first terminal device in the first real scene.

In the mode of short-range sharing, the second terminal device and the first terminal device are arranged in the same real scene. The second virtual object displayed by the second terminal device may be rendered and displayed from a different angle, as the relative spatial position between the third marker and the second terminal device is different from the relative spatial position between the third marker and the first terminal device. In some embodiments, all terminal devices may display the same second virtual object, that is, the visual angle of displaying the second virtual object by the second terminal device may be the same as the angle of display the second virtual object by the first terminal device, the first terminal device shares the second virtual object with the second terminal device.

Figure 13:
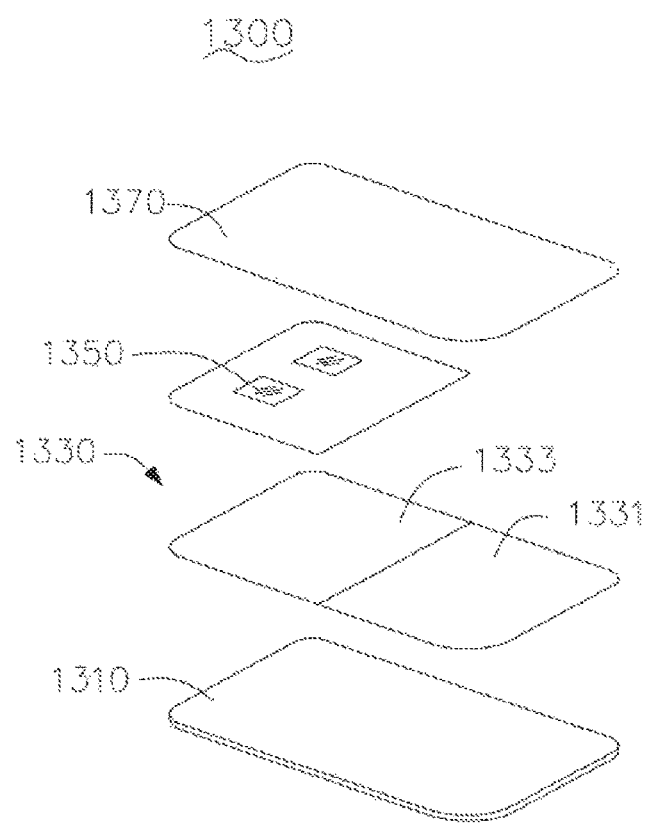
FIG. 13 is a structural diagram of an interaction device according to an embodiment of the present disclosure.

As shown in FIG. 13, an embodiment of the present disclosure provides an interaction device 1300, including a substrate 1310, a control panel 1330, and a first marker 1350. The control panel 1330 may be arranged on the substrate 1330, and the first marker 1350 may be integrated into the control panel 1330. The interaction device 1300 may substantially be flat-plate structured. The substrate 1310 may be a plate or a shell, configured to support the control panel 1330. The control panel 1330 may be stacked on a side of the substrate 1310 and configured to receive operation instructions performed by a user. The control panel 1330 may define a touch region 1331 and a display region 1333. The touch region 1331 may be defined to receive the operation instructions of the user. In one embodiment, the touch region 1331 may include a touch screen. The interaction device 1300 may determine whether the operation instructions are received by detecting a touch state of the touch screen. In some implementations, a plurality of the touch regions 1331 may be defined, and the touch region 1331 may include at least one of the touch screen and the button.

The interaction device 1300 may further include a filter layer 1370. The filter layer 1370 may be stacked on a side of the first marker opposing to the substrate 1310 and configured to filter out any light except a light emitted by an illuminator of the terminal device irradiating the first marker 1350, such that ambient light may not impact a light reflected by the first marker 1350, and the first marker 1350 may be identified easier. In some implementations, a filtering property of the filter layer 1370 may be set according to actual demands. For example, when the first marker 1350 enters a field of view of a camera and is recognized, the camera may use a supplementary light source to improve an efficiency of recognition and to assist in capturing an image, for example, when an infrared light is used for supplementary, the filter layer 1370 may filter out any lights other than the infrared light, only the infrared light may transmit through the filter layer and irradiate the first marker 1350, and may be reflected by the first marker 1350 to a near-infrared camera, such that an impact of the ambient light on a recognition process may be reduced.

In some implementations, the control panel 1330 may further define a pressure region (not shown in the figure), and the pressure region may include a pressure sensor, and the pressure sensor may be configured to sense an external pressure, enabling the interaction device 1300 to generate an operation instruction corresponding to the external pressure. The pressure region may be a partial region of the control panel 1330, or may cover an entire surface of the control panel 1330, or may be overlapping or being spaced apart from the touch region 1331 and/or the display region 1333. The terminal device may acquire pressure data detected in the pressure region and generate the operation instruction based on the pressure data. The operation instruction may be configured to control the virtual content to be displayed in a deformed state, such that the virtual content may be displayed as being extruded by the external pressure to be deformed. Further, based on the pressure data, the deformed state of the virtual content may be calculated based on a predefined function. For example, a degree of the deformation of the virtual content may be proportional to a pressure value, the greater the pressure value, the higher the degree of the deformation of the virtual content. Further, when the pressure value exceeds a predefined pressure threshold, a predefined animation of the image may be displayed, such as the virtual content exploding, disappearing, switching, or the like. The operation instruction may be configured to control a display status of the virtual content, enabling the display status of the virtual content to change (such as color gradient, brightness, or transparency) as the pressure value changes. Specifically, based on the predefined pressure threshold, an actual pressure detected in the pressure region may be compared to the predefined pressure threshold, the degree of a change of the display status of the second virtual object may be controlled based on a ratio of the actual pressure to the predefined pressure threshold.

The touch region 1331 and the display region 1333 may be defined in parallel, and the first marker 1350 may be staked above the display region 1333. In other implementations, the touch region 1331 and the display region 1333 may be overlapped. For example, the touch region 1331 may be defined by a transparent touch screen and may cover the display region 1333, and the first marker 1350 may be arranged between the touch region 1331 and the display region 1333, further reducing a size of the interaction device 1300 to make the interaction device 1300 portable.

Figure 14:
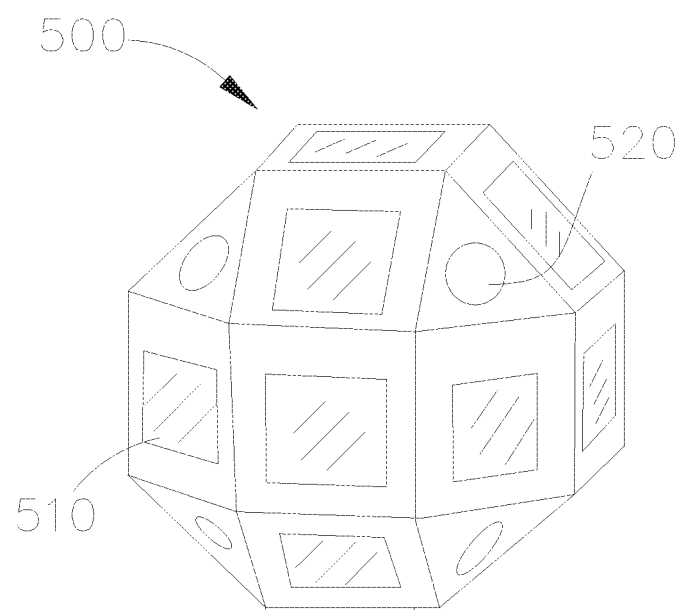
FIG. 14 is a structural diagram of another interaction device according to an embodiment of the present disclosure.

As shown in FIG. 14, an embodiment of the present disclosure may provide another interaction device 500. A second marker 510 may be arranged with the interaction device 500. The terminal device may capture an image containing the second marker 510 to obtain second relative position and pose between the interaction device 500 and the terminal device. As an implementation, the interaction device 500 may be a polyhedron with 26 faces, including 18 squared faces and 8 triangular faces. Further, the interaction device 500 may include a plurality of faces, and the plurality of faces may not be co-planar. Each of the plurality of faces may be arranged with a unique second marker 510. By arranging the unique second marker 510 on each of the plurality of faces, the terminal device may recognize the image containing the second marker 510 from various visual angles, and the second relative position and pose between the terminal device and the interaction device 500 may be obtained from the various angles.

Different second markers 510 arranged on the interaction device 500 may be rotated and/or displaced within a visual range of the terminal device, such that the terminal device may collect information of the second marker 510 on the interaction device 500 at real-time to determine the second relative position and pose between the terminal device and the interaction device 500. In such a way, corresponding virtual content may be displayed in the virtual space based on the second relative position and pose.

The interaction device 500 may further define an operation region 520 for receiving an operation action and sending the operation action to the terminal device, enabling the terminal device to generate an operation instruction to control display of the virtual content. The operation region 520 may include at least one of the touch screen and the button. A plurality of operation regions may be defined, and the plurality of operation regions may correspond to a same operation instruction or different operation instructions. By inputting the operation action to one or more than one of the plurality of operation regions, the terminal device may generate the operation instruction based on the operation action to control the virtual content to be displayed in a corresponded state.

In some embodiments, the interaction device 500 may further include an inertial measurement unit to sense and acquire the pose of the interaction device 500.

In some embodiments, the interaction device 500 may further define a pressure region including a pressure sensor, and the pressure sensor may be configured to sense an external pressure received by the interaction device, allowing the terminal device to generate a corresponded operation instruction based on the external pressure received by the interaction device. The pressure region may be a partial region of the interaction device 500, an entire outer surface of the interaction device 500, or a region overlapping with the above-mentioned operation region 520 or overlapping with a surface receiving the second marker 510.

The present disclosure further provides a computer-readable non-transitory memory, configured to store a program code. The program code may be invoked by the processor to perform the method described in the above-mentioned embodiments. The computer-readable non-transitory memory may include one or more electrical connection portions arranged with a wire, a portable computer device (a magnetic device), a random-access memory, a read-only memory, an erasable programmable read only memory (EPROM), an optical fiber device, or a compact disc read-only memory.

Ordinary skilled in the related art shall understand that a program may instruct related hardware to perform all or a part of the operations included in the method of the above-mentioned embodiments. The program may be stored in a computer-readable non-transitory memory. When the program may execute one or a combination of more than one of the operations included in the method of the above-mentioned embodiments. In addition, each functional unit of each embodiment of the present disclosure may be integrated into one processing module. The processing module integrated with the functional unit may be realized in a form of hardware or in a form of software functional modules. When the processing module integrated with the functional unit is realized in a form of software functional modules and is placed into markets or used, the processing module integrated with the functional unit may be stored in a computer-readable non-transitory memory.

It should be noted that, the above-mentioned embodiments are for the purposes of illustrating technical solutions of the present disclosure, but not to limit the scope of the present disclosure. Although the present disclosure is illustrated in details by referring to the above-mentioned embodiments, the skilled in the related art shall understand that modifications may be performed to the technical solutions described in the above-mentioned embodiments, or equivalent replacement may be performed to a part of technical features of the technical solutions, and the modifications and the equivalent replacement may not cause the essence of the technical solutions to depart from the spirit and scope of the technical solutions of the embodiments of the present disclosure. In a condition without inconsistency, the above-mentioned embodiments may be combined, and features of each embodiment may also be combined. Technical solutions are not limited by the embodiments.

What is claimed is:

1. A method for displaying virtual content, comprising:

capturing, by a terminal device, a first image including a first marker, wherein the first marker is arranged on a first interaction device;

determining, by the terminal device, a display region corresponding to the first interaction device based on the first marker in the first image;

displaying, by the terminal device, a first virtual object, wherein a first display position of the first virtual object in a virtual space corresponds to the display region;

determining an overlapped region between the first virtual object and a second interaction device and selecting a component in the overlapped region of the first virtual object as a second virtual object, in response to determining that spatial coordinates of the second interaction device are covered by rendering coordinates of the first virtual object;

in response to the selection of the second virtual object from the first virtual object, enlarging the second virtual object, and displaying, by the terminal device, the enlarged second virtual object at a second display position in the virtual space independently from the first virtual object, wherein the second display position of the second virtual object in the virtual space corresponds to a predefined superimposing region and is determined based on a third marker arranged in a real scene, the third marker being different from the first marker;

changing at least one of the second display position and a display angle of the second virtual object correspondingly in response to detecting at least one of a position change and pose change of the second interaction device not exceeding a certain value, switching the displayed second virtual object to a new second virtual object in response to detecting the position change or pose change of the second interaction device exceeding the certain value; and displaying the second virtual object at the second display position in a deformed state, in response to pressure data detected from a pressure region arranged on at least one of the first interaction device and the second interaction device.

2. The method of claim 1, wherein the determining, by the terminal device, a display region corresponding to the first interaction device comprises:

recognizing the first marker in the first image;

obtaining first position and pose of the first interaction device;

determining a first spatial position of the display region corresponding to the first interaction device relative to the terminal device based on the first position and pose; and calculating the first display position of the first virtual object in the virtual space based on the first spatial position.

3. The method of claim 1, wherein the method further comprises:

capturing a second image including a second marker, wherein the second marker is arranged on the second interaction device;

recognizing the second marker in the second image;

obtaining second position and pose of the second interaction device; and acquiring the spatial coordinates of the second interaction device based on the second position and pose of the second interaction device.

4. The method of claim 3, wherein the method further comprises:
obtaining second position and pose of the second interaction device;
generating a virtual indicator based on the second position and pose, wherein the virtual indicator is configured for indicating a direction indicated by the second interaction device;
determining a pointed portion of the first virtual object where virtual indicator intersects or collides with the first virtual object; and
selecting the pointed portion of the first virtual object as the second virtual object.

5. The method of claim 1, wherein the method further comprises:
obtaining second position and pose of the second interaction device;
determining whether at least one overlapped portion appears between the second interaction device and the first virtual object based on the second position and pose and a projection of the second interaction device in the virtual space; and
acquiring the second virtual object corresponding to the at least one overlapped portion under a condition of the at least one overlapped portion appearing between the second interaction device and the first virtual object the first virtual object.

6. The method of claim 1, further comprising:
acquiring a content switching instruction; and
switching the displayed second virtual object to another portion of the first virtual object in response to the content switching instruction.

7. The method of claim 6, wherein
prior to the acquiring a content switching instruction, the method further comprises:
generating the content switching instruction under a condition of a virtual indicator emitted from the second interaction device points towards another portion of the first virtual object, or under a condition of the second interaction device overlapping with the another portion of the first virtual object; and
the acquiring a content switching instruction comprises:
pressing a physical button on the second interaction device or on the terminal device.

8. The method of claim 1, wherein the displaying, by the terminal device, the enlarged second virtual object at a second display position in the virtual space comprises:
capturing a third image including the third marker;
recognizing the third marker in the third image, acquiring relative spatial position between the third marker and the terminal device;
determining a second spatial position of the superimposing region relative to the terminal device based on the relative spatial position and the predefined superimposing region;
acquiring the second display position of the second virtual object in the virtual space based on the second spatial position; and
rendering the enlarged second virtual object at the second display position of the second virtual object.

9. The method of claim 1, wherein the first interaction device comprises a touch region, and the method further comprises:

acquiring an operation instruction sent from the first interaction device, wherein the operation instruction is generated by the first interaction device based on a touch operation detected in the touch region; and
controlling display of the first virtual object and the second virtual object based on the operation instruction.

10. The method of claim 1, further comprising:
establishing a communication connection between the terminal device and another terminal device; and
sending, by the terminal device, virtual image data of the second virtual object to the another terminal device, wherein the virtual image data is configured to indicate the another terminal device to perform operations of:
capturing a fourth image including the third marker, and recognize the third marker in the fourth image;
determining a third spatial position of the superimposing region relative to the another terminal device; and
generating the second virtual object based on the virtual image data and displaying the second virtual object at the third spatial position.

11. The method of claim 10, wherein
the terminal device and the another terminal device are arranged in a same scene, the terminal device is configured for close-range sharing by the communication connection established between the terminal device and the another terminal device; or
the terminal device and the another terminal device are arranged in different scenes with a distance apart from each other, the terminal device is configured for remote sharing by the communication connection established between the terminal device and the another terminal device.

12. The method of claim 1, wherein the first virtual object is correlated to different applications, and the displaying a first virtual object comprises:
displaying different types of the first virtual object in response to detecting that the terminal device activates different applications.

13. A system for displaying virtual content, comprising a first terminal device, a first interaction device and a second interaction device, wherein
the first interaction device is arranged with a first marker;
the first terminal device comprises:
a camera, configured to capture a first image including the first marker;
a processor, configured to determine a display region corresponding to the first interaction device based on the first marker in the first image and render the first virtual object; and
a display module, configured to display the first virtual object, wherein a first display position of the first virtual object in a virtual space corresponds to the display region;
the processor is further configured to select, by means of the second interaction device, a portion of the first virtual object as a second virtual object; and
the display module is further configured to, in response to the selection of the second virtual object from the first virtual object, display the second virtual object at a second display position in the virtual space independently from the first virtual object, wherein the second display position of the second virtual object in the virtual space corresponds to a predefined superimposing region and is determined based on a third marker arranged in a real scene, the third marker being different from the first marker; and the display module is further configured to change at least one of the second display position and a display angle of the second virtual object correspondingly in response to detecting at least one of a position change and pose change of the second interaction device not exceeding a certain value, and switch the displayed second virtual object to a new second virtual object in response to detecting the position change or pose change of the second interaction device exceeding the certain value.

14. The system of claim 13, wherein the processor is further configured to recognize the first marker in the first image; obtain first position and pose of the first interaction device; determine a first spatial position of the display region corresponding to the first interaction relative to the terminal device based on the first position and pose; determine the first display position of the first virtual object in the virtual space based on the first spatial position; and render and display the first virtual object at the first display position.

15. The system of claim 13, wherein the processor is further configured to acquire a selection instruction and select the second virtual object from the first virtual object in response to the selection instruction.

16. The system of claim 13, wherein
the second interaction device is arranged with a second marker;
the camera is further configured to capture a second image including the second marker; and
the processor is further configured to recognize the second marker in the second image, obtain second position and pose of the second interaction device, and select the second virtual object from the first virtual object based on the second position and pose.

17. The system of claim 13, further comprising at least one second terminal device;
the first terminal device further comprises a communication module, configured to establish a communication connection with the at least one second terminal device and send virtual image data of the second virtual object to the at least one second terminal device; and
the at least one second terminal device is arranged to capture a fourth image including the third marker via the camera; recognize the third marker in the fourth image via the processor; determine a third spatial position of the superimposing region relative to the at least one second terminal; generate the second virtual object based on the third spatial position and the virtual image data; and display the second virtual object via the display module.

18. The system of claim 17, wherein
the first terminal device and the at least one second terminal device are configured to display the second virtual object from a same visual angle; or
the at least one second terminal device is configured to display a face of the second virtual object which is different from the first terminal device by changing a relative spatial position between the at least one second terminal device and the third marker.

19. A terminal device capable of establishing communications with a first interaction device and a second interaction device, comprising a non-transitory memory and a processor, wherein the non-transitory memory is coupled with the processor and configured to store a computer program, and the processor is configured to execute the computer program to perform operations of:
capturing a first image of a first marker, wherein the first marker is arranged on a first interaction device;
defining a display region corresponding to the first interaction device based on the first marker in the first image, rendering the first virtual object, wherein a first display position of the first virtual object in a virtual space corresponds to the display region;
selecting, by means of the second interaction device, a portion of the first virtual object as a second virtual object;
in response to the selection of the second virtual object from the first virtual object, rendering the second virtual object at a second display position in the virtual space independently from the first virtual object, wherein the second display position of the second virtual object in the virtual space corresponds to a predefined superimposing region and is determined based on a third marker arranged in a real scene, the third marker being different from the first marker; and
switching the displayed second virtual object to a new second virtual object in response to detecting a position change or pose change of the second interaction device exceeding a certain value.

20. The terminal device of claim 19, wherein
the rendering second virtual object at a second display position in the virtual space comprises:
capturing a third image including the third marker;
recognizing the third marker in the third image, and acquiring relative spatial position between the third marker and the terminal device;
determining a second spatial position of the superimposing region relative to the terminal device based on the relative spatial position and a position relation between the predefined superimposing region and the third marker; and
acquiring the second display position of the second virtual object in the virtual space based on the second spatial position, and rendering the second virtual object based on the second display position of the second virtual object;
the processor is further configured to operate operations of:
establishing a communication connection with another terminal device; and
sending virtual image data of the second virtual object to the another terminal device, wherein the virtual image data is arranged to instruct the another terminal device to capture a fourth image including the third marker; recognize the third marker in the fourth image; determine a third spatial position of the superimposing region relative to the another terminal device; and generate and display the second virtual object based on the third spatial position and the virtual image data.

* * * * *